(12) United States Patent
Wu

(10) Patent No.: US 8,355,232 B2
(45) Date of Patent: Jan. 15, 2013

(54) SOLAR MODULE WITH BIMETAL BREAKER

(75) Inventor: Kai Wu, New Taipei (TW)

(73) Assignee: Nexpower Technology Corporation, Taichung (TW)

( * ) Notice: Subject to any disclaimer, the term of this patent is extended or adjusted under 35 U.S.C. 154(b) by 0 days.

(21) Appl. No.: 13/268,297

(22) Filed: Oct. 7, 2011

(65) Prior Publication Data

US 2012/0087054 A1 Apr. 12, 2012

(30) Foreign Application Priority Data

Oct. 8, 2010 (TW) .................................. 99134518 A

(51) Int. Cl.
*H02H 5/04* (2006.01)
(52) U.S. Cl. ........................................ 361/105; 361/103
(58) Field of Classification Search .................. None
See application file for complete search history.

(56) References Cited

U.S. PATENT DOCUMENTS 4,986,255 A * 1/1991 Ito .................................. 126/581

FOREIGN PATENT DOCUMENTS

JP 11040838 * 12/1999

* cited by examiner

*Primary Examiner* — Stephen W Jackson
*Assistant Examiner* — Terrence Willoughby
(74) *Attorney, Agent, or Firm* — Muncy, Geissler, Olds & Lowe, PLLC

(57) ABSTRACT

The primary objective of the present invention is to provide a solar module with a bimetal breaker, which comprises a solar module with terminal ribbons deposited on both sides of the solar module and inter-connecting ribbons extended and connected to the terminal ribbons, and a bimetal breaker being deposited on a joint of the terminal ribbon and the inter-connecting ribbon of the solar module. The bimetal breaker comprises a bimetal unit that is composed of two metal layers, and when the bimetal unit is heated, the bimetal unit will bend because of different thermal expansion coefficients and push the conducting terminals to separate from each other, so as to prevent the solar module from being damaged due to high temperature.

10 Claims, 8 Drawing Sheets

SOLAR MODULE WITH BIMETAL BREAKER

CROSS-REFERENCE TO RELATED PATENT APPLICATION

This application claims the benefit of Taiwan Patent Application No. 099134518, filed on Oct. 8, 2010, in the Taiwan Intellectual Property Office, the disclosure of which is incorporated herein in its entirety by reference.

FIELD OF THE INVENTION

The present invention relates to a solar module with a bimetal breaker, in particular to a solar module with an auto electrical circuit breaking function.

BACKGROUND OF THE INVENTION

As the energy shortage problem gets worse and worse, all the countries in the world are trying to find alternative energy sources to substitute the current dwindling energy sources. Of all current alternative energy sources, the solar energy will not deplete the resources on earth. Neither will it be exhausted, nor cause environmental pollution. Therefore, it is recognized as one of the best alternative energy sources. With the progress of semiconductor technology, the photoelectric conversion rates of solar modules have been improved continuously. Thus, it is regarded as one of the most appropriate methods to solve the problem of energy shortages.

However, in current applications the solar modules are exposed for long period of time to strong sunshine. As a result, the temperature control of the solar modules has always been an important problem which needs to be addressed cautiously. Moreover, the reverse current of a solar module system frequently causes a surge of temperature. In case a solar module is frequently subject to high temperature, it will lead to the damage of the solar module. Therefore, protecting solar modules from damaging by high temperature is a key design concept. In consideration of the above mentioned factors, the inventor of the present invention conceives a solar module with a bimetal breaker to overcome the defects of the conventional technology, and to broaden the applications of the present invention.

SUMMARY OF THE INVENTION

In order to solve the problems of the prior art, the objective of the present invention is to provide a solar module with a bimetal breaker to overcome the bottlenecks of the prior art.

In order to achieve the goal mentioned above, the technical means of the present invention is to design a solar module with a bimetal breaker. Both sides of the solar module respectively dispose a terminal ribbon, and inter-connecting ribbons are connected to the terminal ribbons extending out of the solar module to respectively define a positive electrode and a negative electrode. The bimetal breaker, disposed at a corresponding joint of the terminal ribbon and the inter-connecting ribbon, the bimetal breaker comprises a housing, a first conducting terminal, a second conducting terminal, and a bimetal unit. The first and the second conducting terminals are deposited inside the housing with one of the conducting terminals connected to the terminal ribbon and the other connected to the inter-connecting ribbon, and the first conducting terminal is fixed to the housing while the second conducting terminal is in contact with the first conducting terminal and pushable from the first conducting terminal. The bimetal unit is deposited on one side of the second conducting terminal and composed of two metal layers with different thermal expansion coefficients, and when the bimetal unit is heated, the bimetal unit will bend and push the second conducting terminal separated from the first conducting terminal.

The metal layer of the bimetal unit with a higher thermal expansion coefficient is an active layer, and the metal layer of the bimetal unit with a lower thermal expansion coefficient is a passive layer. The active layer is made of a material selected from the group of brass, nickel, an alloy of nickel, manganese, and brass, an alloy of nickel, chromium, and iron, and an alloy of nickel, manganese, and iron, and the passive layer is made of an alloy of nickel and iron with the nickel content of the passive layer between 34% and 50%. The bimetal unit will bend when the operating temperature reaches 90 degrees Celsius and push the second conducting terminal separated from the first conducting terminal.

In order to further achieve the goal mentioned above, another technical means of the present invention is to design a solar module with a bimetal breaker, comprising a solar module and a bimetal breaker. Both sides of the solar module respectively dispose a terminal ribbon, and inter-connecting ribbons are connected to the terminal ribbons and extending out of the solar module to respectively define a positive electrode and a negative electrode. The bimetal breaker, disposed on the inter-connecting ribbon close to a joint of the wire and the inter-connecting ribbon, the bimetal breaker comprises a first conducting terminal, a second conducting terminal, and a bimetal unit. After the inter-connecting ribbon is cut off, the first and second conducting terminals are connected to the two corresponding cut-off ends of the inter-connecting ribbon respectively, wherein the second conducting terminal is in contact with the first conducting terminal and pushable from the first conducting terminal. The bimetal unit, deposited on one side of the second conducting terminal, is composed of two metal layers with different thermal expansion coefficients, and when the bimetal unit is heated, the bimetal unit will bend and push the second conducting terminal separated from the first conducting terminal.

The metal layer of the bimetal unit with a higher thermal expansion coefficient is an active layer, and the metal layer of the bimetal unit with a lower thermal expansion coefficient is a passive layer. The active layer is made of a material selected from the group of brass, nickel, an alloy of nickel, manganese, and brass, an alloy of nickel, chromium, and iron, and an alloy of nickel, manganese, and iron, and the passive layer is made of an alloy of nickel and iron with the nickel content of the passive layer between 34% and 50%. The bimetal unit will bend when the operating temperature reaches 90 degrees Celsius and push the second conducting terminal separated from the first conducting terminal.

In order to further achieve the goal mentioned above, the other technical means of the present invention is to design a solar module with a bimetal breaker, comprising a solar module, a wire box, and a bimetal breaker. Both sides of the solar module respectively dispose a terminal ribbon and inter-connecting ribbons are connected to the terminal ribbons and extending out of the solar module to respectively define a positive electrode and a negative electrode. The wire box is connected to the solar module and comprises a housing with two wires extending from the housing and connected to the two corresponding inter-connecting ribbons, while the two wires inside the housing are connected to a conducting terminal respectively. The bimetal breaker is deposited on one of the conducting terminals in the wire box and comprises a first conducting terminal, a second conducting terminal, and a bimetal unit. After the conducting terminal is cut off, the first and the second conducting terminals are respectively connected to the two corresponding cut-off ends of the conducting terminal. The second conducting terminal is connected to the first conducting terminal and could be pushed and moved to separate from the first conducting terminal. The bimetal unit is deposited on one side of the second conducting terminal and composed of two metal layers with different thermal expansion coefficients, and when the bimetal unit is heated, the bimetal unit will bend and push the second conducting terminal separated from the first conducting terminal.

The metal layer of the bimetal unit with a higher thermal expansion coefficient is an active layer, and the metal layer of the bimetal unit with a lower thermal expansion coefficient is a passive layer. The active layer is made of a material selected from the group of brass, nickel, an alloy of nickel, manganese, and brass, an alloy of nickel, chromium, and iron, and an alloy of nickel, manganese, and iron, and the passive layer is made of an alloy of nickel and iron.

The present invention of the solar module with a bimetal breaker is so designed that when the temperature of the solar module reaches a threshold temperature higher than its normal operating temperature, the bimetal breaker will break the circuit loop and stops the electric current flow so that the solar module will not be damaged and safety is enhanced.

DESCRIPTION OF THE PREFERRED EMBODIMENTS

In order to make it easy for the understanding of the characteristics, merits, contents, and functions of the present invention, the following text provides a detailed explanation of the preferred embodiments together with attached diagrams/figures. It should be noted that the diagrams are provided for explanatory purpose, and not meant to provide the actual dimensions of the preferred embodiments. Therefore, the scope of the present invention should not be restricted according to the dimensions and layout of the attached diagrams.

Figure 1:
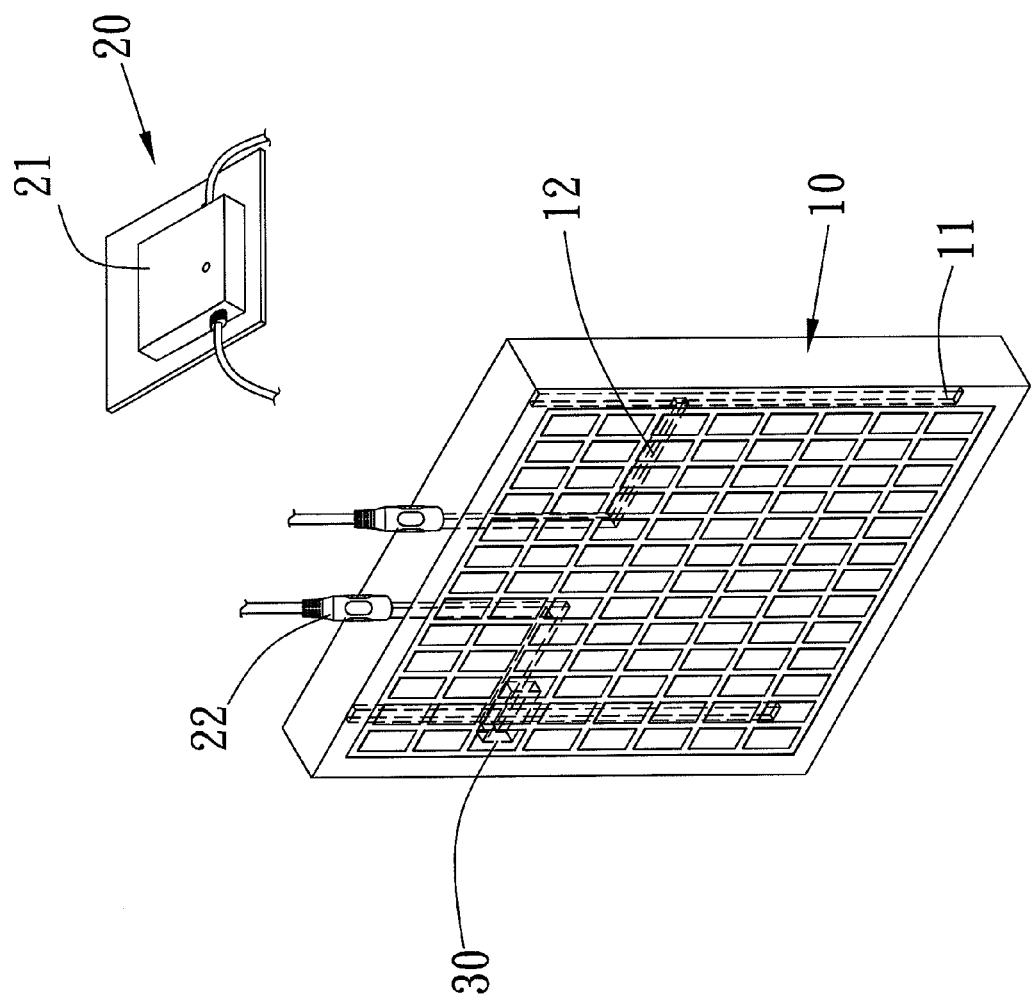
FIG. 1 is the exterior view of the present invention of the solar module with a bimetal breaker.
Figure 2:
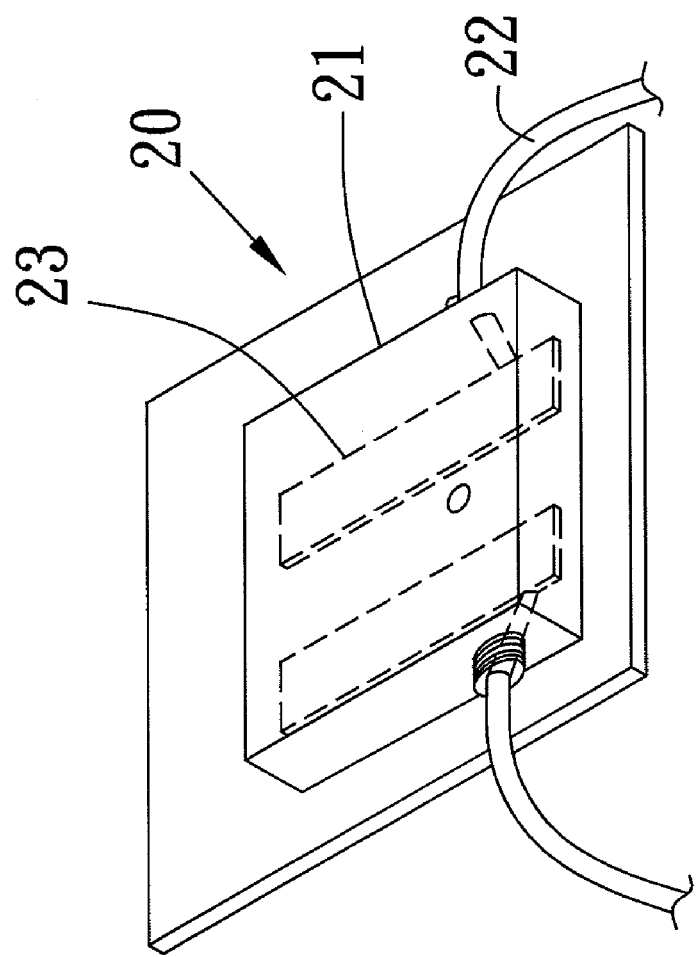
FIG. 2 is the exterior view of the wire box of the present invention of the solar module with a bimetal breaker.

As illustrated in FIG. 1 and FIG. 2, the present invention is a solar module with a bimetal breaker. In a preferred embodiment, the present invention comprises a solar module 10, a wire box 20, and a bimetal breaker 30.

The above-mentioned solar module 10 is a multi-layered semiconductor structure, and a terminal ribbon 11 is deposited on both sides of the solar module, wherein an inter-connecting ribbon 12 is connected to the terminal ribbon 11 and extending out of the solar module 10 to respectively define a positive electrode and a negative electrode.

The wire box 20 is connected to the solar module 10 to integrate the electric current. The wire box 20 comprises a housing 21. Two wires 22 extending from the housing 21 of the wire box 20 are connected respectively to the two corresponding inter-connecting ribbons 12. The two wires 22 inside the wire box 21 are connected respectively to the two conducting terminals 23.

Figure 3:
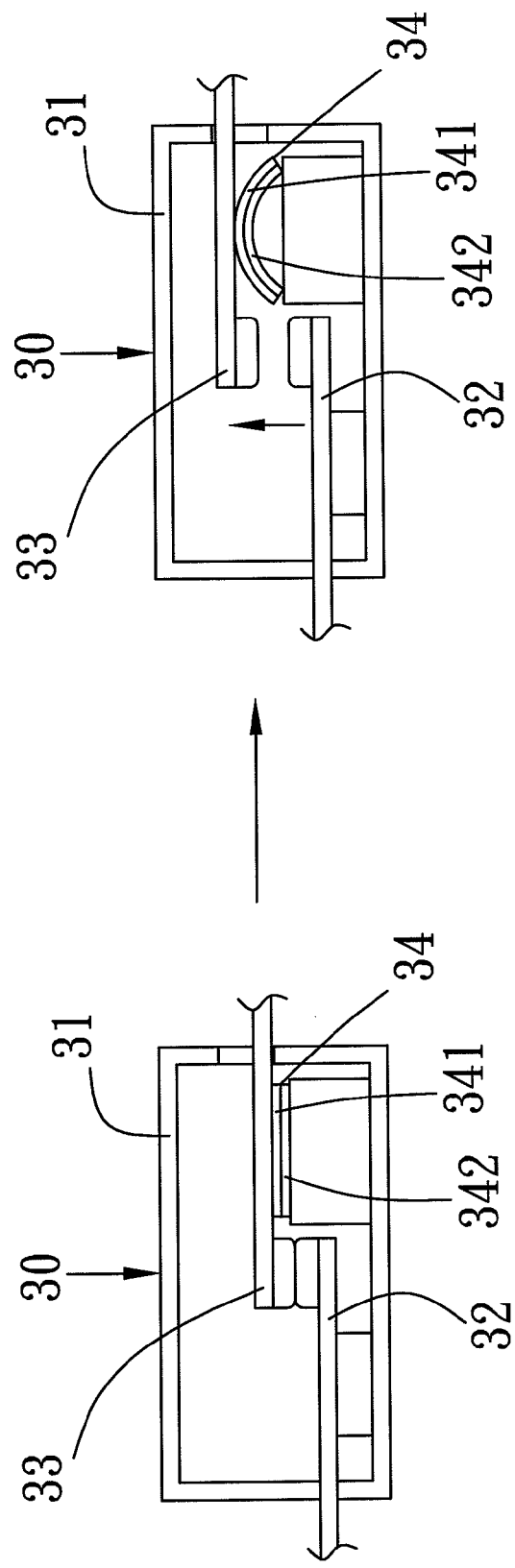
FIG. 3 is the embodiment diagram of the bimetal unit of the present invention of the solar module with a bimetal breaker.

As illustrated in FIG. 3, the bimetal breaker 30 is deposited on an electricity conducting circuit of the solar module 10. In a preferred embodiment, the bimetal breaker 30 is best positioned at the spot where higher temperature is prone to occur. For example, the bimetal breaker 30 can be deposited at a joint of the terminal ribbon 11 and the inter-connecting ribbon 12. The bimetal breaker 30 further comprises a box 31, a first conducting terminal 32, a second conducting terminal 33, and a bimetal unit 34. Wherein, the first conducting terminal 32 and the second conducting terminal 33 are deposited inside the box 31 with one of them connected to the terminal ribbon 11 and the other connected to the inter-connecting ribbon 12. The conducting terminal 32 is fixed to the box 31, and the second conducting terminal 33 is connected to the first conducting terminal 32 and can be pushed and moved to keep a distance from the first conducting terminal 32. The bimetal unit 34 is deposited on one side of the second conducting terminal 33 and composed of two metal layers with different thermal expansion coefficients. Wherein, the layer with a higher coefficient is an active layer 341, and the layer with a lower coefficient is a passive layer 342. When the bimetal unit 34 is heated, the bimetal unit 34 will bend and push the second conducting terminal 33 to separate from the first conducting terminal 32. It should be noted that the box 31 is presented herein for explanatory purpose, and it is designed as an optional device. As a result, it should not be used to restrict the scope of the present invention.

Figure 4:
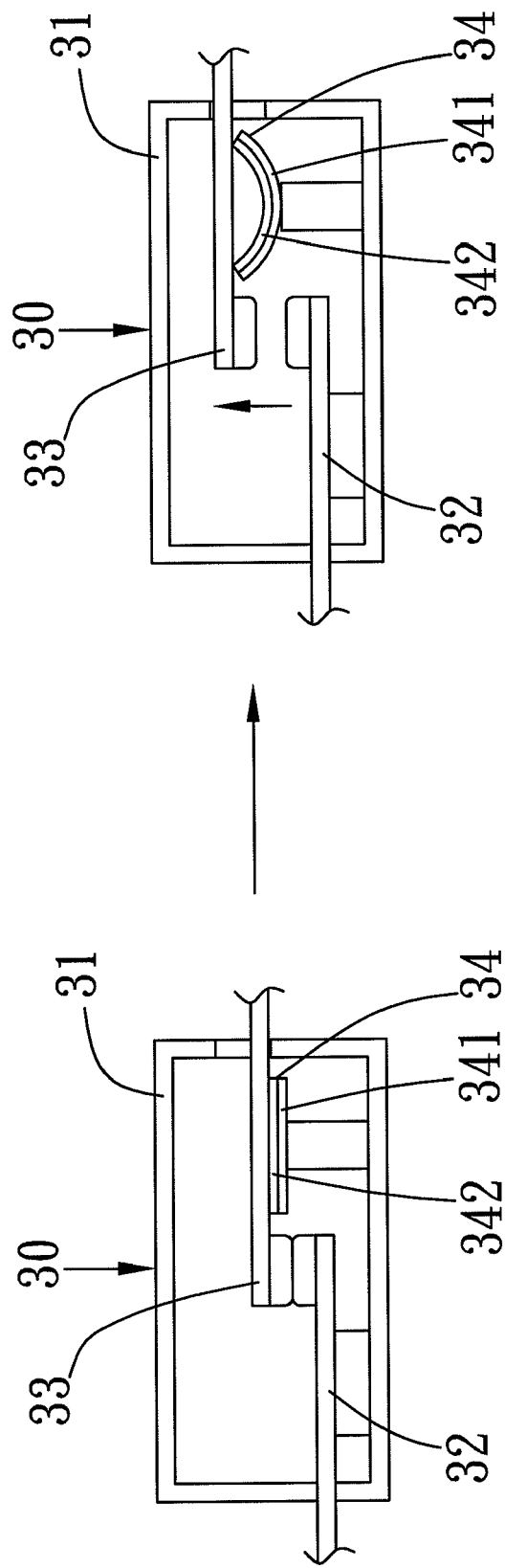
FIG. 4 is the embodiment diagram of the bimetal unit of the present invention of the solar module with a bimetal breaker.
Figure 5:
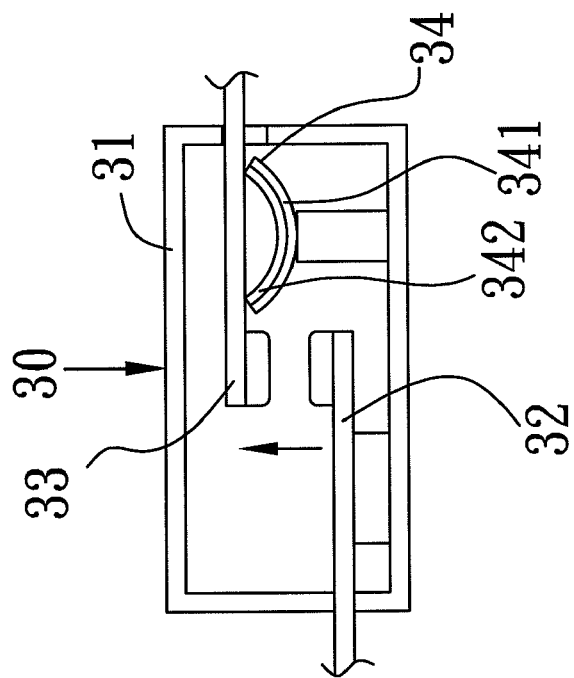
FIG. 5 is the embodiment diagram of the bimetal unit of the present invention of the solar module with a bimetal breaker.
Figure 5:
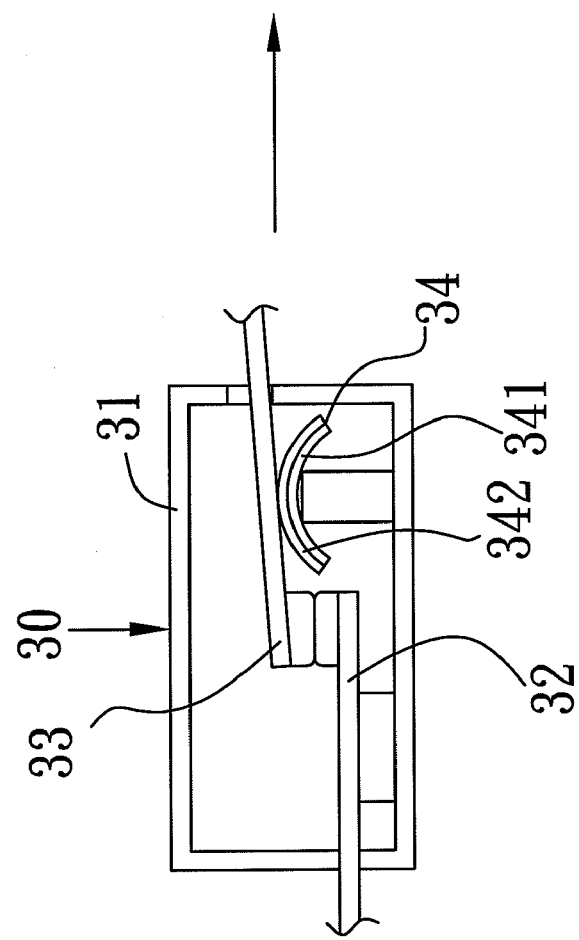
Figure 6:
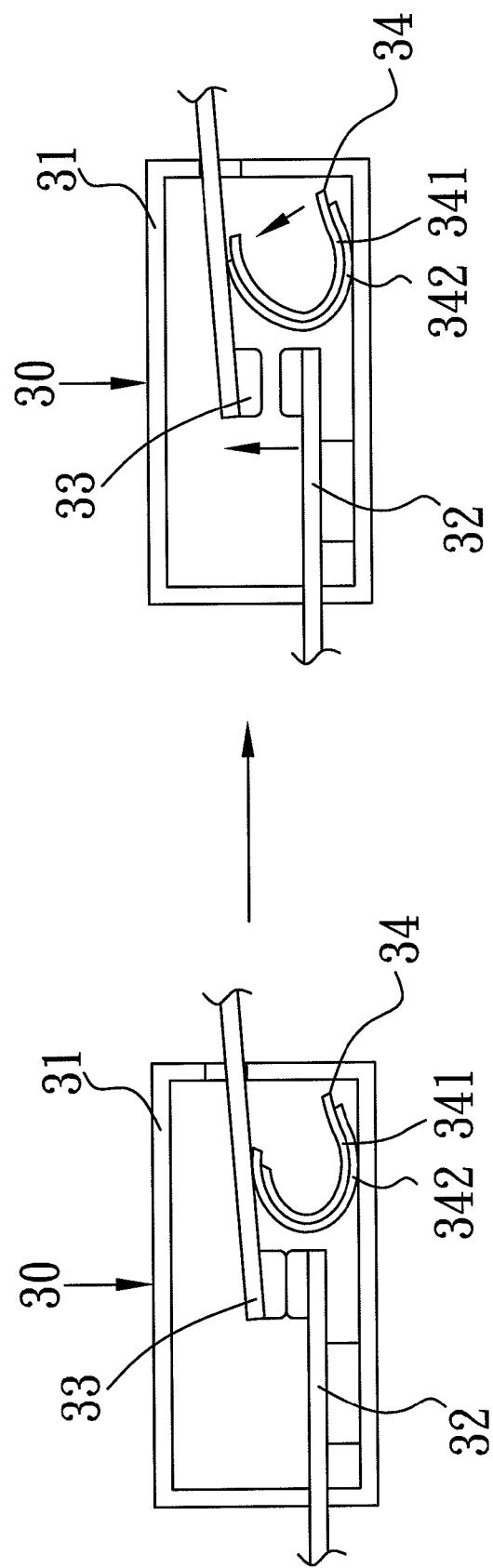
FIG. 6 is the embodiment diagram of the bimetal unit of the present invention of the solar module with a bimetal breaker.

As illustrated in FIG. 4 through 6, there are a number of embodiments for the bimetal unit 34. The fact that two closely combined metal layers will bend after being heated is within the domain of common knowledge and numerous modifications and variations could be made thereto by those skilled in the art, thus it is needless to address each of the embodiments in great detail. However, the scope of the present invention covers those embodiments implemented through the replacement and change of equivalent functionality. Wherein the active layer 341 can be made of a material selected from the group of brass, nickel, an alloy of nickel, manganese, and brass, an alloy of nickel, chromium, and iron, or an alloy of nickel, manganese, and iron. The passive layer 342 can be made of an alloy of nickel and iron, and the content of nickel ranges between 34% and 50%. When the temperature of the bimetal unit 34 reaches 90 degrees Celsius, it will bend and break the electric flow of the solar module 10.

Figure 7:
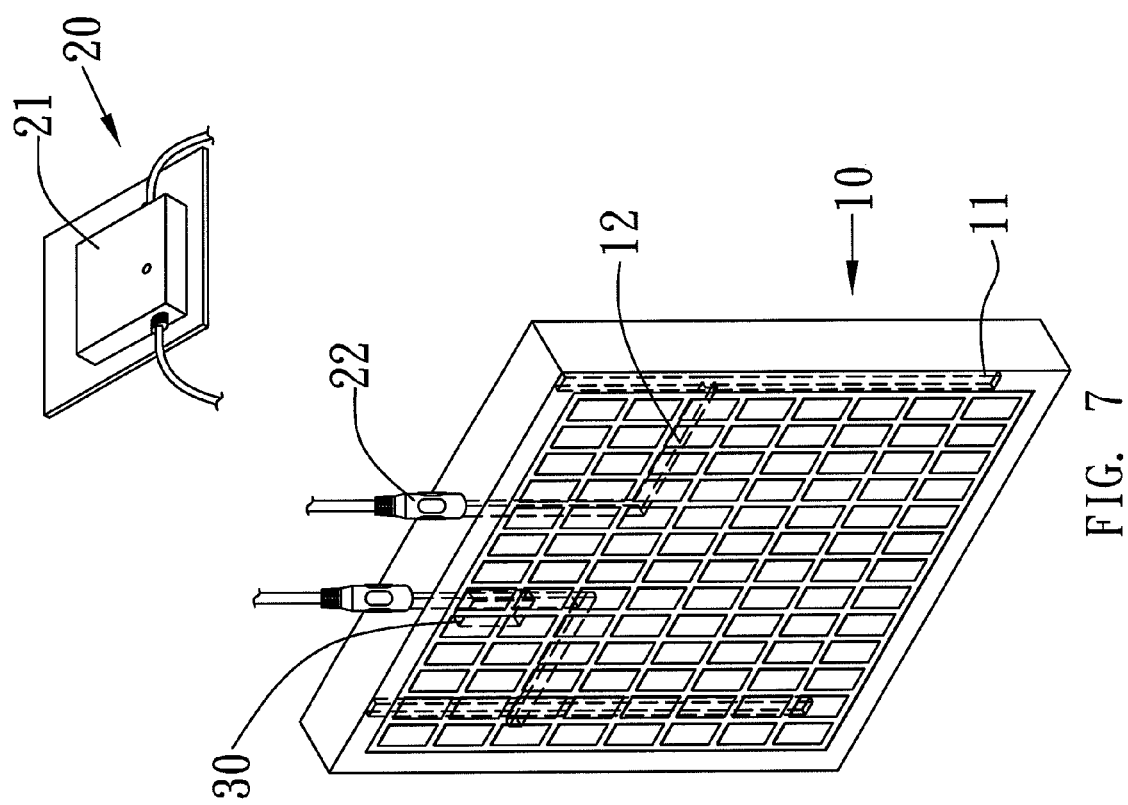
FIG. 7 is the exterior view of the present invention of the solar module with a bimetal breaker embodied in its first variance.

In a variant embodiment illustrated in FIG. 7, the bimetal breaker 30 can be deposited on the inter-connecting ribbon 12 close to a joint of the wire 22 and the inter-connecting ribbon 12, and after the inter-connecting ribbon 12 is cut off, the first 32 and the second conducting terminals 33 are connected to the two corresponding cut-off ends of the inter-connecting ribbon 12.

Figure 8:
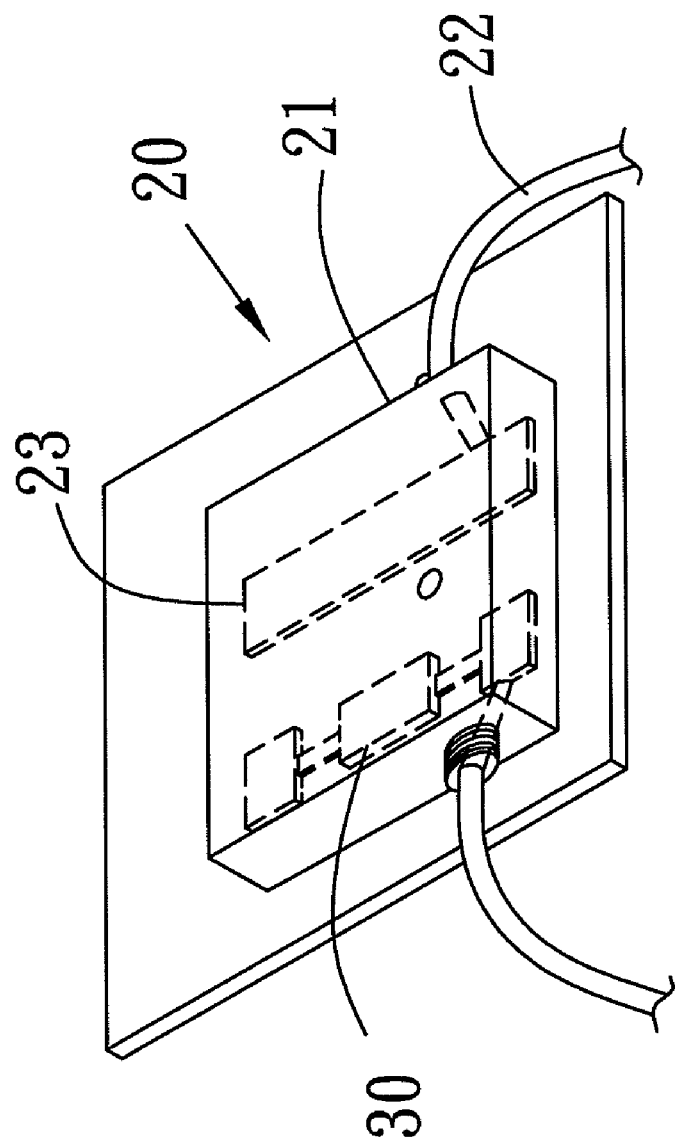
FIG. 8 is the exterior view of the wire box of the present invention of the solar module with a bimetal breaker embodied in its first variance.

In another variant embodiment illustrated in FIG. 8, the bimetal breaker 30 can be deposited on the conducting terminal 23 of the wire box 20, and after the conducting terminal 23 is cut off, the first 32 and the second conducting terminal 33 are connected to the two corresponding cut-off ends of the conducting terminal 23.

When the operating temperature of the solar module 10 exceeds the threshold temperature or when the temperature is too high, the bimetal unit 34 inside the bimetal breaker 30 will bend and push the second conducting terminal 33 to cut off the electric current loop and stop the current flow, whereby, to prevent the solar module 10 from being damaged and enhance the safety of the device. Further, since the structure of the present invention is quite simple, it will lower the costs in actual application and facilitate its embodiment.

Exemplary embodiments have been disclosed herein to describe the techniques and characteristics of the present invention and they are used and are to be interpreted in a generic and descriptive sense only and not for purpose of limitation. Accordingly, numerous modifications and variations could be made by those skilled in the art without departing from the scope and spirit of the invention set forth in the claims.

What is claimed is:

1. A solar module with a bimetal breaker, comprising:
   a solar module, wherein both sides of the solar module respectively dispose a terminal ribbon, and inter-connecting ribbons are connected to the terminal ribbons and extending out of the solar module to respectively define a positive electrode and a negative electrode; and
   a bimetal breaker, disposed at a corresponding joint of the terminal ribbon and the inter-connecting ribbon, the bimetal breaker comprising a box, a first conducting terminal, a second conducting terminal, and a bimetal unit; wherein the first and second conducting terminals are deposited inside the box with one of the conducting terminals connected to the terminal ribbon and the other connected to the inter-connecting ribbon, and the first conducting terminal is fixed to the box and the second conducting terminal is in contact with the first conducting terminal and pushable from the first conducting terminal; wherein the bimetal unit deposited on one side of the second conducting terminal is composed of two metal layers with different thermal expansion coefficients, and when the bimetal unit is heated, the bimetal unit will bend and push the second conducting terminal separated from the first conducting terminal.

2. The solar module with a bimetal breaker of claim 1, wherein the metal layer of the bimetal unit with a higher thermal expansion coefficient is an active layer, and the metal layer of the bimetal unit with a lower thermal expansion coefficient is a passive layer, wherein the active layer is made of a material selected from the group of brass, nickel, an alloy of nickel, manganese, and brass, an alloy of nickel, chromium, and iron, and an alloy of nickel, manganese, and iron, and the passive layer is made of an alloy of nickel and iron.

3. The solar module with a bimetal breaker of claim 2, wherein the nickel content of the passive layer is between 34% and 50%.

4. The solar module with a bimetal breaker of claim 1, wherein the bimetal unit will bend when an operating temperature reaches 90 degrees Celsius and push the second conducting terminal separated from the first conducting terminal.

5. A solar module with a bimetal breaker, comprising:
   a solar module, wherein both sides of the solar module respectively dispose a terminal ribbon, and inter-connecting ribbons are connected to the terminal ribbons and extending out of the solar module to respectively define a positive electrode and a negative electrode; and
   a bimetal breaker, disposed on the inter-connecting ribbon close to a joint of a wire and the inter-connecting ribbon, the bimetal breaker comprising a first conducting terminal, a second conducting terminal, and a bimetal unit; wherein, after the inter-connecting ribbon is cut off, the first and second conducting terminals are connected to the two corresponding cut-off ends of the inter-connecting ribbon, wherein the bimetal unit deposited on one side of the second conducting terminal is composed of two metal layers with different thermal expansion coefficients, and when the bimetal unit is heated, the bimetal unit will bend and push the second conducting terminal separated from the first conducting terminal.

6. The solar module with a bimetal breaker of claim 5, wherein the metal layer of the bimetal unit with a higher thermal expansion coefficient is an active layer, and the metal layer of the bimetal unit with a lower thermal expansion coefficient is a passive layer, wherein the active layer is made of a material selected from the group of brass, nickel, an alloy of nickel, manganese, and brass, an alloy of nickel, chromium, and iron, and an alloy of nickel, manganese, and iron, and the passive layer is made of an alloy of nickel and iron.

7. The solar module with a bimetal breaker of claim 6, wherein the nickel content of the passive layer is between 34% and 50%.

8. The solar module with a bimetal breaker of claim 5, wherein the bimetal unit will bend when an operating temperature reaches 90 degrees Celsius and push the second conducting terminal separated from the first conducting terminal.

9. A solar module with a bimetal breaker, comprising:
   a solar module, wherein both sides of the solar module respectively dispose a terminal ribbon, and inter-connecting ribbons are connected to the terminal ribbons and extending out of the solar module to respectively define a positive electrode and a negative electrode;
   a wire box connected to the solar module, comprising a housing with two wires extending from the housing and the wires connected to the two corresponding inter-connecting ribbons, wherein the wires inside the housing are connected to a conducting terminal respectively; and
   a bimetal breaker deposited on one of the conducting terminals of the wire box, wherein the bimetal breaker comprises a first conducting terminal, a second conducting terminal, and a bimetal unit; wherein, after the conducting terminal of the wire box is cut off, the first and the second conducting terminals of the bimetal breaker are connected to the two corresponding cut-off ends of the conducting terminal of the wire box respectively, wherein the bimetal unit deposited on one side of the second conducting terminal of the bimetal breaker is composed of two metal layers with different thermal expansion coefficients, and when the bimetal unit is heated, the bimetal unit will bend and push the second conducting terminal separated from the first conducting terminal.

10. The solar module with a bimetal breaker of claim 9, wherein the metal layer of the bimetal unit with a higher thermal expansion coefficient is an active layer, and the metal layer of the bimetal unit with a lower thermal expansion coefficient is a passive layer, wherein the active layer is made of a material selected from the group of brass, nickel, an alloy of nickel, manganese, and brass, an alloy of nickel, chromium, and iron, and an alloy of nickel, manganese, and iron, and the passive layer is made of an alloy of nickel and iron.

* * * * *